Sept. 20, 1955     A. L. GRISÉ     2,718,276
AIR SEPARATOR

Filed Oct. 27, 1953     3 Sheets-Sheet 1

INVENTOR
ALFRED L. GRISÉ
BY *Chapin & Neal*
ATTORNEYS

Sept. 20, 1955  A. L. GRISÉ  2,718,276
AIR SEPARATOR

Filed Oct. 27, 1953  3 Sheets-Sheet 2

INVENTOR
ALFRED L. GRISÉ
BY Chapin + Neal
ATTORNEYS

Sept. 20, 1955     A. L. GRISÉ     2,718,276
AIR SEPARATOR
Filed Oct. 27, 1953     3 Sheets-Sheet 3
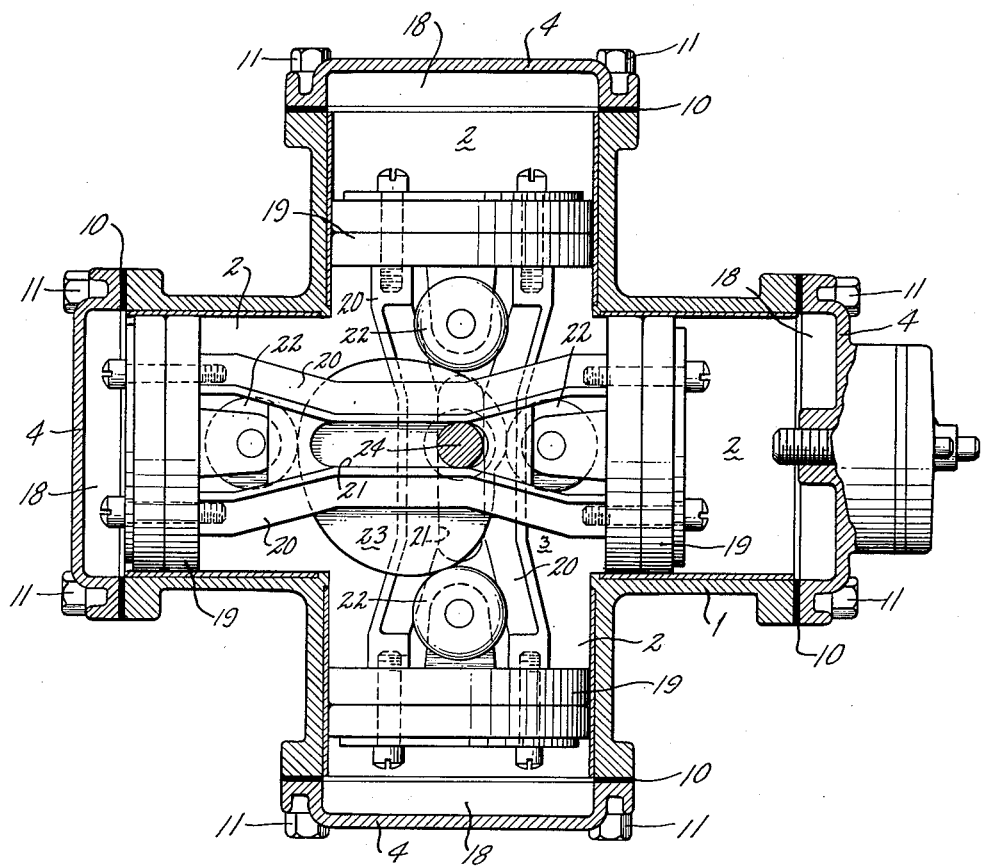
INVENTOR
ALFRED L. GRISÉ
BY Chapin + Neal
ATTORNEYS

United States Patent Office 2,718,276
Patented Sept. 20, 1955

2,718,276

AIR SEPARATOR

Alfred L. Grisé, Springfield, Mass., assignor to Gilbert & Barker Manufacturing Company, West Springfield, Mass., a corporation of Massachusetts Application October 27, 1953, Serial No. 388,564

3 Claims. (Cl. 183—2.5)

This invention relates to a meter, adapted for measuring liquids and provided with a separator for eliminating from the liquid before it is measured any air or other gases that may be contained therein.

The invention, while capable of general application, has one advantageous use in connection with apparatus such as is used at service stations for dispensing measured quantities of motor fuels, such as gasoline.

The general object of the invention is to provide an air separator, which is located immediately above the measuring mechanism of the meter so that the separator outlet for air-free liquid will substantially coincide with the valve-controlled inlet to the measuring mechanism of the meter.

The arrangement described eliminates all intervening conductors between the separator outlet for air-free liquid and the meter inlet ports, in which conductors air might enter due to leaks therein. The arrangement also avoids any possibility of forcing air through the measuring mechanism of the meter after the latter has been primed. Any air or gas contained in the conduit that supplies the separator will by-pass such mechanism and be forced through the air outlet of the separator and quickly eliminated. Sometimes, due to a leaky foot valve in the suction pipe of the pump, liquid will run back through the pump into the supply tank, leaving air in the conduit or, due to vaporization of the liquid, the conduit may become filled with gas. Then, if the separator is located remotely from the meter and air or gas, from the described or any other cause, enters the intervening conductor between the separator and meter, such air or gas can only be eliminated by forcing it through the measuring mechanism of the meter, resulting in incorrect indications on the register, which have to be corrected in some manner. The present arrangement, by eliminating intervening conductors between the separator outlet for air-free liquid and the meter inlet, eliminates all troubles which have heretofore occurred from the causes mentioned.

The invention is especially desirable in service stations of the type wherein a single pump supplies a number of meters which are remotely located. The provision of a separator in each meter insures freedom from the troubles that might otherwise occur if a single separator were used with the single pump and long conduits intervened between the separator and meters.

The invention also has for an object the provision of an air separator which is so efficient in its action that the separator chambers may be made of much smaller volume than heretofore and of such small volume that the separator can be entirely contained within the usual valve chamber that is formed in the top cover of the meter.

More particularly, the separator utilizes a coalescing roll, through which all fluids entering the cover have to pass and which has the property of coalescing many small bubbles of air into fewer large bubbles that more readily and rapidly rise to the top of the valve chamber, thereby increasing the speed and efficiency of separation so that only a relatively small space, such as that found within the usual meter cover, will suffice for effective separation of air from liquid.

The invention has for an object the provision of a combined air separator and meter that can be manufactured at a cost, which is little more than that of the meter itself, since the meter casing also serves to house the air separator and the only additional elements needed are the coalescing roll and its supporting means.

These and other objects will more particularly appear from the following description of the one illustrative embodiment of the invention shown in the accompanying drawings, in which Fig. 1 is a sectional elevational view of a combined meter and air separator embodying the invention;

Fig. 4 is a sectional plan view taken on the line 4—4 of Fig. 1 and showing the cylinders and pistons of the meter and the actuating mechanism for the meter valve;

Fig. 5 is a fragmentary sectional elevational view taken on the line 5—5 of Fig. 2;

Figure 1:
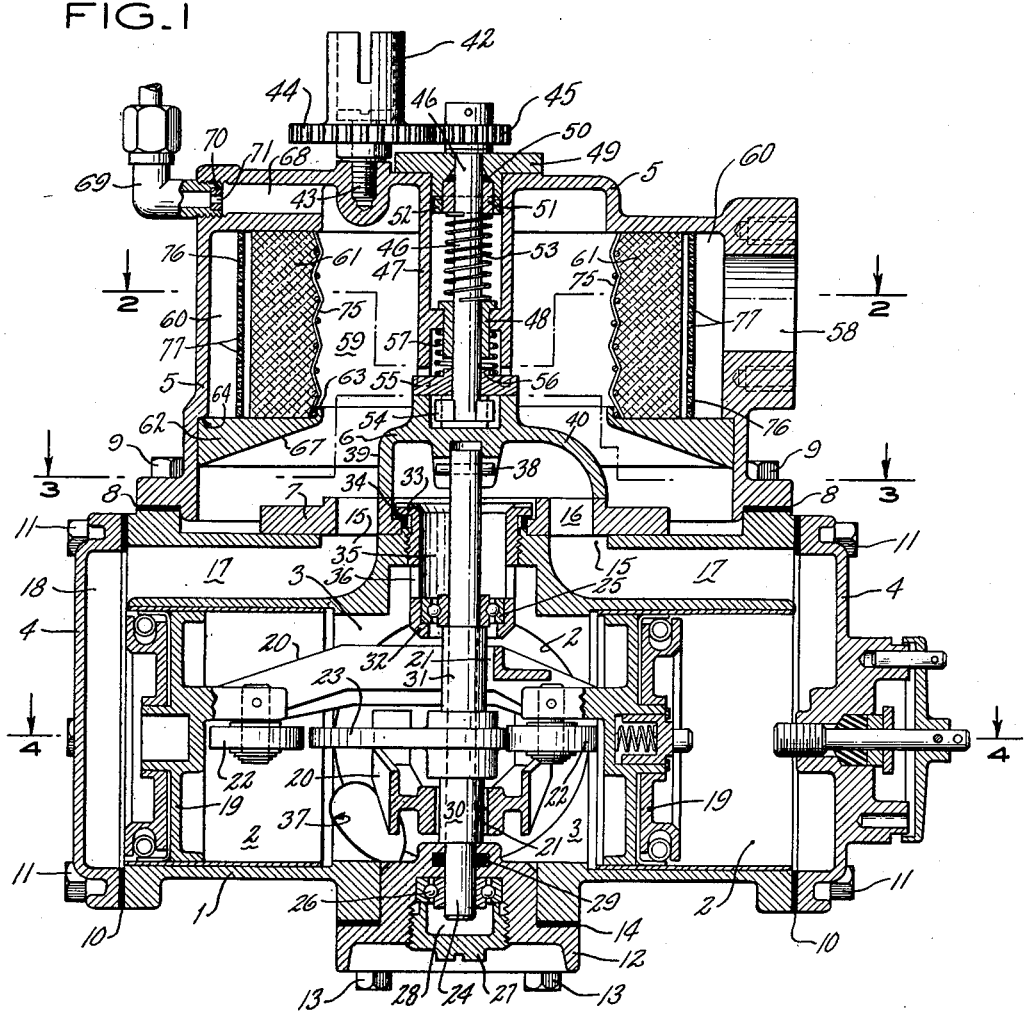

Referring to these drawings; the casing of the meter (Fig. 1) consists of a lower or body member 1, within which are formed a plurality (four as shown in Fig. 4) of cylinders 2, radiating from a central chamber 3; heads 4, one for each cylinder, for closing the outer ends thereof; and a hollow upper member or cover 5 for enclosing the distributing valve 6 of the meter and its seat 7, the latter being mounted on the flat upper face of body member 1. The cover 5 has at its lower end an outturned flange, which is clamped with an interposed gasket 8 to said upper face by a plurality of screws 9. Each head 4 is clamped with an interposed gasket 10 to the end of its cylinder by screws 11. The body member 1 has central openings in its upper and lower walls leading into the central chamber 3. The lower of such openings is closed by a cover 12 which is clamped with an interposed gasket 14 to the member 1 by screws 13. The other of such openings serves to conduct liquid discharged from the cylinders 2 to the central chamber 3, as will later be described in detail. Surrounding the last-named opening are a circular series of angularly-spaced openings 15, each underlying a port 16, formed in and extending through the valve seat 7, and each connecting with one end of a passage 17. Each passage 17 extends radially outward along and above a cylinder 2 and connects at its outer end with a recess 18 formed in the head 4 of such cylinder.

Figure 3:
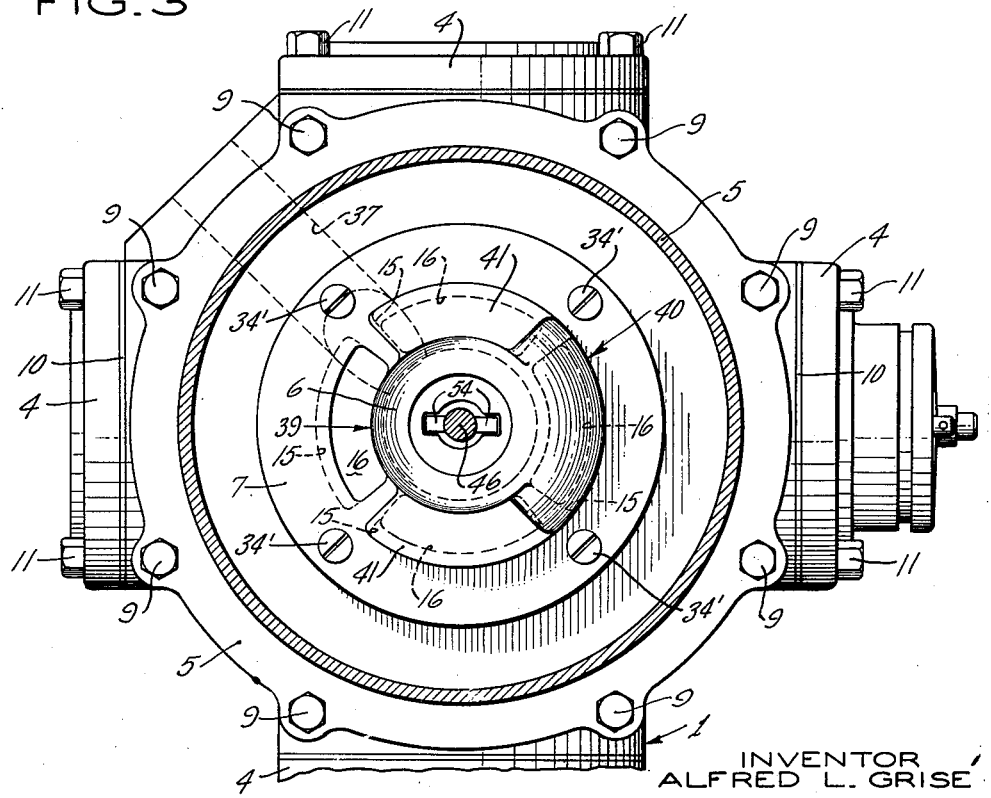
Fig. 3 is a sectional plan view taken on the line 3—3 of Fig. 1 and showing the valve of the meter and the lower part of the air-separating chamber.

Slidably mounted in each cylinder 2 is a suitable piston 19. The opposed pistons of each pair are rigidly interconnected by a member 20 having a longitudinal slot 21 therethrough. These members 20 are offset so as to cross one above the other and slide back and forth without interference. Each member carries two rolls 22, one located near each piston 19 and both riding on the periphery of a cam 23. The latter is fixed to a shaft 24, which extends vertically through the central chamber 3 and through the slots 21 in members 20 and is rotatably supported in upper and lower ball bearings 25 and 26, respectively. The lower bearing 26 is mounted in a recess in the lower cover 12, the outer race of the bearing being clamped in place by a nut 27, which is threaded into the cover 12 and has a recess 28 to receive grease for lubricating the bearing. Mounted in cover 12 above the bearing 26 is an O-ring 29 which has a sealing engagement with shaft 24. Encompassing shaft 24 is a spacing sleeve 30 the lower end of which rests on top of cover 12 and the upper end of which engages and supports the lower hub of cam 23. Resting on the upper hub of cam 23 is a second spacing sleeve 31, the upper end face of which engages and supports the inner race of the upper bearing 26. The outer race of the upper bearing 26 is fixed in the lower end of a sleeve 32, which surrounds the upper part of shaft 24 in coaxial relation and is threaded into the described upper opening in the body member 1. The upper end of the sleeve 32 has a head 33, which clamps through a gasket 34 the central portion of the described valve seat 7. The seat is further held in place by screws 34' (Fig. 3). The sleeve 32 (Fig. 1) is open at its upper end and has a passage 35, which extends from such end downwardly to the bearing 25 and communicates at its lower end through a series of ports 36 in the peripheral wall of sleeve 32 with the upper part of the central chamber 3. The upper end of passage 35 constitutes a discharge port and this passage 35 together with the ports 36 constitute a discharge passage for connecting the discharge port to the central chamber 3, which has a discharge passage 37 (Fig. 3) leading outwardly therefrom and adapted for connection with the dispensing conduit.

The valve 6 (Fig. 1) is driven by shaft 24. The upper end of this shaft fits into a hole in the inner and downturned hub of the valve and has fixed therein a diametrical pin 38, the ends of which are received in slots in said hub for an operable driving engagement, leaving the valve free however for a limited amount of movement axially of the shaft. The valve 6 has the shape of an inverted cup and encompasses the upper end of sleeve 32, communicating with the open upper end of the latter or the discharge port and thus with passage 35, ports 36, central chamber 3 and the discharge passage 37. The downturned rim of this valve has one portion 39 (Fig. 3) of slightly less than 270° angular extent, which is curved coaxially of shaft 24 and has an outside radius equal to the inside radius of valve ports 16, and another portion 40 of slightly more than 90° angular extent which is curved coaxially of shaft 24 and has an inside radius equal to the outer radius of the valve ports. Projecting outwardly from the portion 39 at diametrically opposite locations are two flat wings 41, one adjacent each end of the portion 40, and each of slightly less than 90° angular extent. Each such wing has inner and outer edges curved coaxially of shaft 24 and having an inner radius slightly less than the inner radius of the valve ports 16 and an outer radius slightly greater than the outer radius of the valve ports. These wings are each of sufficient area to entirely cover one valve port. The outwardly offset portion of the valve that has the curved rim portion 40 is of sufficient area to overlie one valve port and connect it to the central discharge port. The remainder of the valve is cut away to the rim 39 to uncover one valve port and allow it to communicate with the lower portion of the space within the cover 5.

The cover 5 carries a coupling 42, adapted for driving a suitable register (not shown) which indicates the amount of liquid that passes through the meter. This coupling is rotatably mounted on a stud 43, secured as shown to the cover, and has fixed thereon a gear 44, which meshes with a pinion 45, fixed on the upper end of a shaft 46. The cover 5 has depending from its upper wall, coaxially of the valve 6 and shaft 46, a sleeve 47. Shaft 46 extends coaxially of and through this sleeve and is supported by upper and lower bearings. The lower bearing 48 is fixed in the sleeve 47 intermediate its ends and the upper bearing is provided in a cover 49, the flanged upper end of which is suitably fixed to the top of cover 5 and the lower cylindrical portion of which closely fits in the upper end of the sleeve 47. The lower end of the last-named cylindrical portion is bored to receive an O-ring 50 of rubber-like material and a gland 51, which is slidable on shaft 46 and is pressed upwardly by a spring 53 to compress the ring 50 into sealing engagement with the shaft. The flange of the gland 51 has two notches therein, receiving one in each a downturned projection 52 on the lower end of cover 49, whereby to keep the gland from turning with the shaft 46. The lower end of the latter enters a recess in the upper hub of valve 6 and has fixed thereto a blade 54, which extends diametrically therethrough and has projecting ends that engage one in each of two notches formed in the upper hub of the valve, whereby the latter may drive shaft 46. Resting on top of the upper hub of valve 6 are arms 55 which project radially outward from a hub 56 and engage one in each of two notches formed in the lower end of sleeve 47. The hub 56 is slidably mounted on shaft 46 and a spring 57, coiled around the shaft within sleeve 47, presses the arms 55 against the valve 6 and holds the latter to its seat at times when there is no liquid pressure available for the purpose.

Liquid is supplied to the meter through an inlet passage 58 in the annular side wall of cover 5 and through an air separator which is contained entirely within the cover 5. The space within the latter is subdivided by partitioning means into an inner chamber 59 and an outer chamber 60, both these chambers being annular in form and surrounding the sleeve 47 in coaxial relation. The partitioning means includes a suitable coalescing wall 61, which in this example is annular and in the form of a roll, and a bottom closure wall 62 for the outer chamber 60. The upper end face of the coalescing roll 61 is seated on the inner flat face of the top wall of cover 5 and the lower end face of this roll rests on top of the annular wall 62 and within an upturned annular rim 63 on such wall. The latter engages a shoulder 64 on the inner peripheral wall of cover 5 and is clamped thereto by a plurality of nuts 65, screwed on the threaded lower ends of a plurality of stud bolts 66, which extend upwardly through outer chamber 60 and have their upper ends threaded into the top wall of cover 5. The coalescing roll 61 is thus clamped between the bottom closure wall 62 of chamber 60 and the top wall of cover 5. The lower face of the wall 62 slopes upwardly and inwardly, presenting an upwardly-converging frusto-conical surface 67, which forms the upper wall for that lower part of the inner chamber 59 that underlies the outer chamber 60. The inner chamber 59 has an outlet passage 68 of restricted area for the escape of air and gases and liquid containing the same. This passage connects with an elbow 69, adapted for connection to any suitable means by which the air and gases are separated from the liquid and the liquid recovered. The elbow has fixed therein a disk 70 containing a small orifice 71, which, in this example, has a diameter of .12 inch. The separating and liquid-recovery means, may be of the kind shown in my prior Patent No. 2,642,148, granted June 16, 1953.

Figure 6:
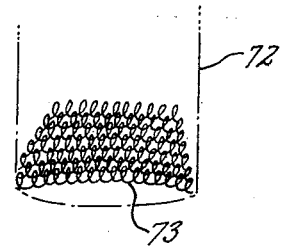
Fig. 6 is a fragmentary top plan view of the tubular knitted fabric from which the annular coalescing roll of the separator is made.
Figure 7:
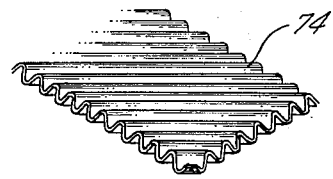
Fig. 7 is a fragmentary perspective view showing how the fabric of Fig. 6 is crimped before being wound up into roll form.
Figure 2:
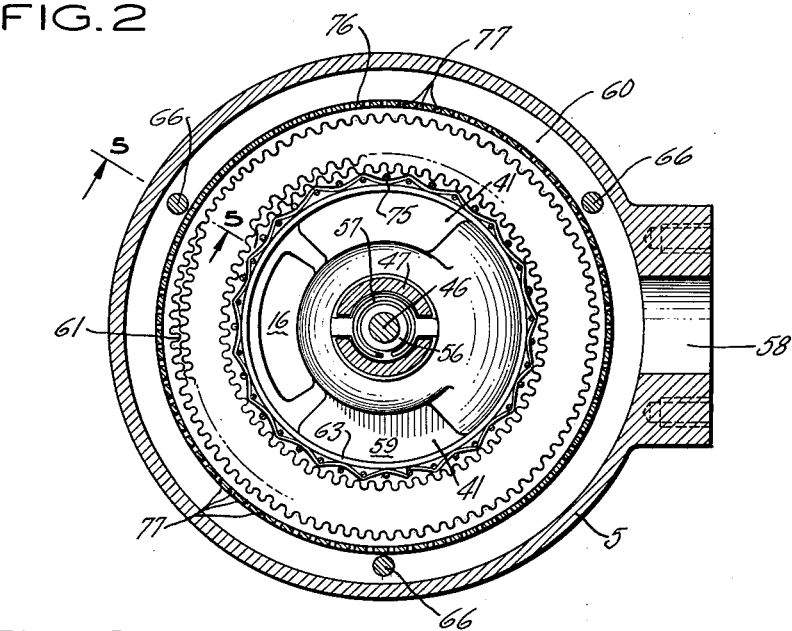
Fig. 2 is a sectional plan view taken on the line 2—2 of Fig. 1 and showing the chambers of the air separator.

The coalescing roll 61 is made up of a suitable length of fabric formed of fine metal wire. In the preferred form herein shown, a tubular knitted metal fabric is used. A portion of the fabric strip is shown at 72 in Fig. 6. Very fine wire, of non-corrosive metal, such for example, as Monel metal, is knitted, as indicated at 73, into a tubular fabric. This fabric is then flattened down, forming a two-ply strip. Then, this two-ply strip is crimped in a manner shown at 74 in Fig. 7. The crimping lines are preferably disposed at an acute angle to the sides of the strip. To avoid confusion of lines, the knitting is shown separately in Fig. 6 and the crimping is shown separately in Fig. 7. The strip, formed as described, is wound up, as indicated in Fig. 2, into roll form. Preferably, it is wound on a foraminous core, such as the core 75, which consists of a length of coarse mesh wire screen rolled up into the form of an annulus with its ends suitably secured together. The coalescing roll is tightly wound and the ridges of one convolution fit into the hollows of an adjacent convolution. The roll, thus formed, presents a compact mass of interfitting and intertangled wires, providing a very large number of very small interstices. The exceedingly small passages through this wire mass are necessarily exceedingly tortuous.

Preferably, the coalescing roll described is encompassed by a foraminous cylinder 76 for the purpose of distributing the liquid entering through inlet passage 58 into the outer chamber 60 and causing the liquid to enter the coalescing roll at a large number of points equally distributed around its entire circumference. This diffuser should not be in contact with the roll. The diffuser 76, in the particular form herein shown, consists of a cylinder of thin metal having a large number of holes 77 of small diameter equally distributed around its periphery. As one example, the diffuser 76, herein shown, has substantially 300 holes 77 per square inch each of 1/32" in diameter and its area is about 35 square inches so that there are more than 10,000 of these holes.

In normal operation, the cylinders 2, the chamber 3, and all the passages and ports of the meter will be completely filled with air-free liquid and so also will be the chambers 59 and 60 of the separator. Should back flow occur from any cause, the separator chambers can drain only to the level of the bottom of the inlet passage 58 and there will be left a substantial depth of air-free liquid in the inner chamber of the separator. When pumping subsequently occurs, any air or gas that is in the conduit leading to the separator will be quickly forced through the coalescing roll 61 into the inner chamber 59 and forced out, together with any air that is in such chamber, through the restricted outlet orifice 71 into a suitable liquid recovery chamber. The coalescing roll and the restricted outlet orifice 71 offer little resistance to the flow of air alone and therefore the air will be rapidly eliminated. Until the air is eliminated, the meter will not operate because of the lack of the necessary pressure. When however, the separator is filled, the restricted outlet 71 offers substantially increased resistance to the flow of liquid and pressure builds up sufficiently to operate the meter pistons and the distributing valve 6 in the usual manner.

Normally, the separation of air has to be effected under a substantial pressure, say for example, 20 p. s. i. Separation is effected by gravity action, the heavier parts of the fluid falling to the bottom of the chamber 59 from which they enter the meter and the lighter portions rising to the top of the chamber from which they leave through the restricted outlet 71. Of course, some liquid escapes with the air through outlet 71 to be separated and recovered in the usual manner by a secondary separator operating under atmospheric pressure. Effective separation of air from liquid by gravity action, while these mixed fluids are under a substantial pressure can be obtained entirely by adequate reduction in the velocity of the liquid but this requires separator chambers of relatively large volume. By expediting the separating action the volume of the separator chambers can be substantially reduced. The use of the roll 61 expedites the separating action by coalescing many tiny air bubbles into large ones which rise more readily and rapidly in the chamber 59. The mixed fluids, as they enter through inlet 58, are usually in the form of a froth-like emulsion of liquid and many tiny bubbles of air. This emulsion is forced into the coalescing roll and, in its passage through the latter, many of these tiny air bubbles will be combined into one large bubble. Thus, the fluids entering chamber 59 will be in the form of liquid containing a much smaller number of much larger air bubbles and these larger air bubbles rise rapidly to the top of chamber 59 to be expelled through the outlet 68. The fluids in outer chamber 60 are forced by the diffuser screen 76 to enter the coalescing roll 61 at a large number of different locations (somewhat over 10,000 in this example) equally distributed about its periphery. The use of the coalescing roll 61 enables a very substantial reduction in the volume of the separator to be effected without any impairment of the efficiency of the separating action. In particular, the volume has been decreased so much (to 80 cubic inches) that the separator can be located entirely within the cover of the meter. Thus, the one casing, which ordinarily contains only the meter parts, can also be made to contain the separator. Consequently, a combined meter and air separator can be provided without increase in volume and with little increase in cost, the additional expense being simply the cost of the coalescing roll and its supporting means.

The invention thus provides a combined meter and air separator characterized in that the separator has a sufficiently low volume to be located entirely within the usual cover, which has within it the valve chamber of the meter, so as to effect separation of air from the liquid just before the liquid enters the measuring mechanism of the meter; in that reduction in volume of the separator is effected by increased efficiency in the separating action by the use of a coalescing roll; and in that the cost of the combined units is not much greater than the cost of the meter unit alone.

What is claimed is:

1. An air separator, comprising, a casing having a top wall, a bottom wall and an interconnecting peripheral wall, said top wall having on its inner face a flat annular seat and said peripheral wall having an annular shoulder located between the top and bottom walls and in a plane parallel to said seat, a pervious annular coalescing roll the upper end face of which engages said seat, and the outer periphery of which is spaced from the inner face of said peripheral wall, an annular wall the upper face of which engages said shoulder and the lower end face of the coalescing wall, and fastening means for holding said annular wall against said shoulder, said casing having an inlet for liquid opening into the space between said roll and peripheral wall and above said annular wall, an outlet for air-free liquid in the bottom wall and an outlet for air in the top wall opening into the space inside said annular roll.

2. The combination, as claimed in claim 1, in which the lower face of said annular wall slopes inwardly and upwardly to prevent trapping air bubbles in the space beneath it and above the bottom wall.

3. The combination, as claimed in claim 1, in which the inlet for liquid is formed in the peripheral wall and a foraminous cylinder encompasses the annular roll with its inner periphery radially spaced from the outer periphery of the roll and its end faces engaged one with said annular seat and the other with the upper face of said annular wall.

References Cited in the file of this patent

UNITED STATES PATENTS

| | | |
|---|---|---|
| 858,154 | Conversy | June 25, 1907 |
| 1,777,806 | Nichols | Oct. 7, 1930 |
| 1,829,401 | Kamrath | Oct. 27, 1931 |
| 1,893,429 | McGogy | Jan. 3, 1933 |
| 2,091,912 | De Lancey | Aug. 31, 1937 |
| 2,106,651 | Parker et al. | Jan. 25, 1938 |
| 2,592,685 | Grisé | Apr. 15, 1952 |
| 2,642,148 | Grisé | June 16, 1953 |

FOREIGN PATENTS

| | | |
|---|---|---|
| 611,892 | Germany | Apr. 8, 1935 |